March 23, 1965  S. L. GERSON  3,174,223
CUTTING AND SERVING IMPLEMENT
Filed Dec. 20, 1962
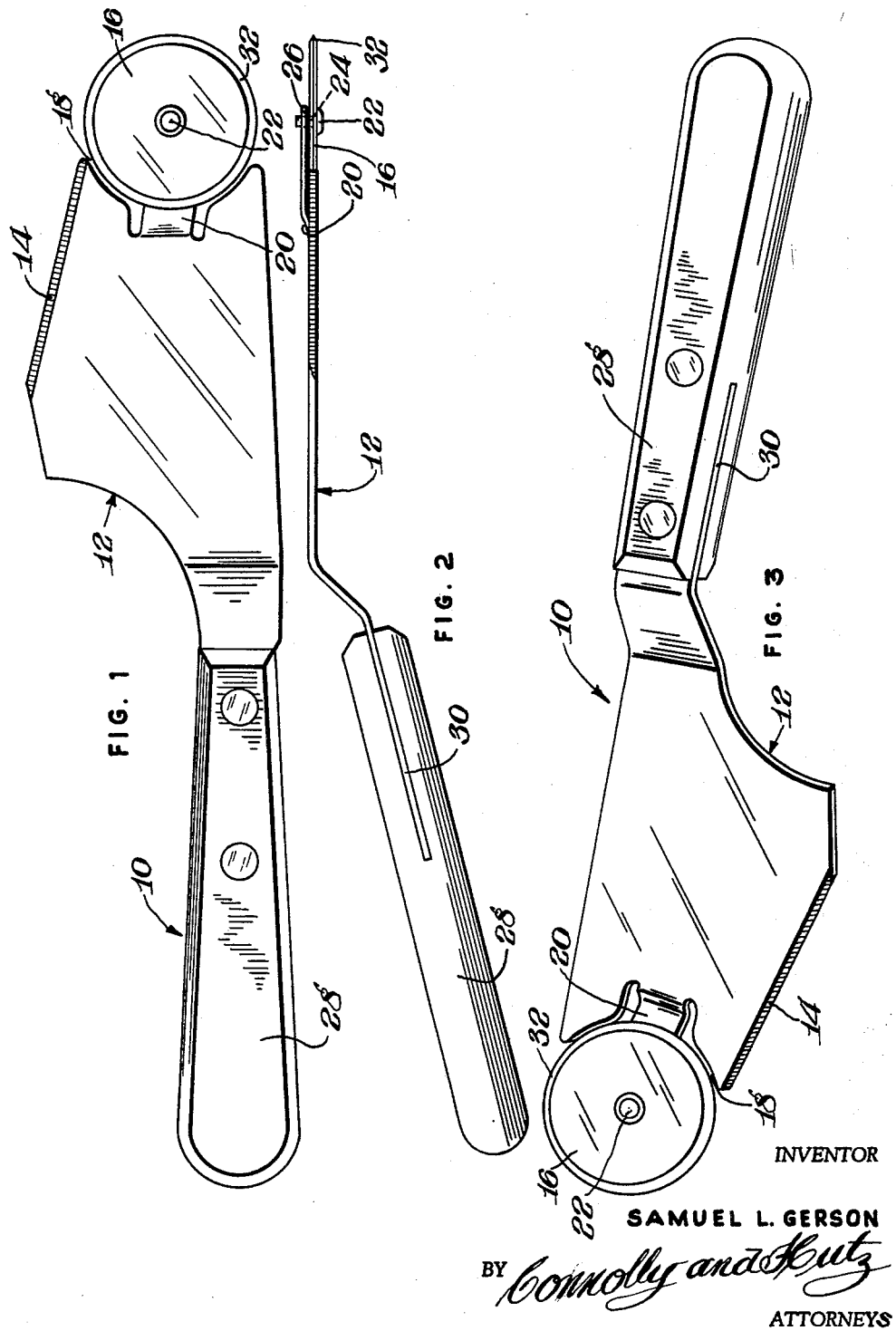
INVENTOR
SAMUEL L. GERSON
BY Connolly and Hutz
ATTORNEYS

United States Patent Office 3,174,223
Patented Mar. 23, 1965

3,174,223
CUTTING AND SERVING IMPLEMENT
Samuel L. Gerson, P.O. Box 65, Wilmington 99, Del.
Filed Dec. 20, 1962, Ser. No. 246,032
3 Claims. (Cl. 30—142)

This invention relates to a kitchen implement for simultaneously cutting and lifting food from a pan, and it more particularly relates to such an implement that facilitates the serving of neatly cut sections of food.

It is quite difficult to cut and lift neatly cut sections of various types of fragile food from a pan in a form that can be attractively served. Such fragile foods are scrambled eggs, and various pies and cakes that readily crumble, such as pizza pie. Conventional kitchen cutting and serving implements also do not permit curved or intricately designed sections to be served without considerable waste.

An object of this invention is to provide a kitchen implement that facilitates the cutting and serving of neat attractive sections of food from a pan.

Another object is to provide such an implement that facilitates the serving of intricately cut sections of fragile food.

In accordance with this invention a flat sharp-edged disc is rotatably mounted in front of a spatula blade having a sharp-edge upon its side. The sharp edges of the disc and the blade are substantially aligned to permit them to cooperate with each other in cutting and lifting food from a pan. A particularly effective form of this invention is provided by mounting a portion of the disc within a recess in front of the blade upon a tongue extending from the front of the blade. This tongue is displaced outside of the plane of the blade to cause the plane of the disc to be aligned with that of the blade. The rotating disc cuts even the most intricate designs into fragile foods without crumbling them, and the blade following directly behind it easily inserts itself under food separated and slightly lifted by the disc to facilitate the simultaneous cutting and serving of even the most intricately designed sections of fragile food by even relatively unskilled users.

Novel features and advantages of the present invention will become apparent to one skilled in the art from a reading of the following description in conjunction with the accompanying drawings wherein similar reference characters refer to similar parts and in which:

FIG. 1 is a side view in elevation of one embodiment of this invention;

FIG. 2 is a top plan view of the implement shown in FIG. 1; and

FIG. 3 is a three-dimensional view of the implement shown in FIGS. 1 and 2.

In FIGS. 1-3 is shown a cutting and serving kitchen implement 10 including a spatula blade 12 having a sharp lower edge 14 which is for example serrated. A flat disc 16 substantially equal in thickness to blade 12 is rotatably mounted within a recess 18 in the front of blade 12 upon a tongue 20. Disc 16 is rotatably mounted upon tongue 20 by pin 22 extending through hole 24 in disc 16. Pin 22 is for example secured to tongue 20 by riveting thereto, and the portion 26 of tongue 20 in back of disc 16 is bent outside of the plane of blade 12 to cause disc 16 to be aligned with blade 12 as shown in FIG. 2.

A handle 28 is attached to the back end 30 of blade 12, which is offset to facilitate manipulation. Sharp edge 14 of blade 12 is disposed at an angle to the line of handle 28 to also facilitate manipulation.

Disc 16 is mounted relative to blade 12 to cause its edge to be substantially aligned with sharp edge 14, and edge 14 is approximately tangential with disc 16 as shown in FIGS. 1 and 3. The disposition of disc 16 within arcuate recess 18 permits the sharp edge 32 of disc 16 and sharp edge 14 of blade 12 to lie quite close to each other, in what might be considered quasi-contact, such as within one thirty-second of an inch and closer if manufacturing tolerances permit. This facilitates the operation of implement 10 as later described in detail.

Operation

Implement 10 is shown in FIG. 3 in the approximate position in which it is held by a right-handed user. Rotating disc 16 is used for cutting the food in a pan, and its rotation facilitates cutting of the most intricate curves at angles up to 90° to the plane of the pan. Cuts may also be made from the bottom of the pan up its sides for example to separate any stuck pieces of food, such as pie and cake that adhere to the side.

However the most unique action of this implement is accomplished by the simultaneous cutting and lifting action provided by the rotating disc and closely following blade. Intricately designed sections cut out and slightly lifted by the rotating disc can accordingly be immediately caught on the sharp edge of the blade following the disc whereby even the most intricately cut designs of fragile food can be immediately lifted for serving. The close disposition of the following blade edge 14 behind sharp edge 32 of disc 16, at a separation which is preferably no greater than $\frac{1}{32}$ inch, facilitates this remarkably efficient and delicate lifting operation.

It is accordingly possible to neatly separate and lift without breaking or crumbling intricately curved sections of fragile pies and pastries including pizza pie, banana cream pie, gelatin molds, puddings, etc. The serrations on sharp edge 14 of blade 12 also facilitate the insertion of the blade under food cut and slightly lifted by the rotating sharp edge 14 of disc 16. The efficient action of implement 10 also facilitates the separation of pieces of fragile food such as pie crust that might be stuck upon the sides or bottom of a pan. This implement accordingly makes it possible for the first time for the average cook to consistently cut and serve intricately formed sections of even the most fragile foods.

What is claimed is:

1. A cutting and serving kitchen implement comprising a spatula blade having a sharp lower edge, a handle upon said blade, a flat disc substantially as thin as said blade and having a sharp edge, and bracket means rotatably mounting said disc in front of said blade with an edge of said disc substantially aligned with said sharp edge of said blade, said sharp edge of said blade quasi-contacting the edge of said disc remote from said bracket means, and said sharp edge of said blade being approximately tangential to said disc whereby the rotating sharp edge of said disc and said sharp edge of said blade are disposed for cooperating with each other in simultaneously cutting and lifting food from a pan.

2. A cutting and serving kitchen implement comprising a spatula blade having a sharp lower edge, a handle upon said blade, a flat disc substantially as thin as said blade and having a sharp edge, bracket means rotatably mounting said disc in front of said blade with an edge of said disc substantially aligned with said sharp edge of said blade, said sharp edge of said blade being disposed closely adjacent the edge of said disc remote from said bracket means, said sharp edge of said blade being approximately tangential to said disc whereby the rotating sharp edge of said disc and said sharp edge of said blade are disposed for cooperating with each other in simultaneously cutting and lifting food from a pan, an arcuate portion being disposed in the front of said blade, and a portion of said disc being mounted within said recess.

3. An implement as set forth in claim 2 wherein said bracket means comprises a tongue extending from the front of said blade within said recess, a hole in the center of said disc, a pin through said hole rotatably securing said disc upon said tongue, and said tongue being disposed outside of the plane of said blade to cause the plane of said disc to be disposed in line with the plane of said blade.

References Cited in the file of this patent
UNITED STATES PATENTS

| | | |
|---|---|---|
| 116,136 | Aguayo | June 20, 1871 |
| 162,792 | Brechbiel | May 4, 1875 |
| 722,282 | Buehler | Mar. 10, 1903 |
| 1,388,547 | Burns | Aug. 23, 1921 |
| 1,528,615 | Janeck | Mar. 3, 1925 |
| 1,530,796 | Thomsen | Mar. 24, 1925 |